June 24, 1930.   J. F. KROUPA   1,767,378
ATTACHMENT FOR LISTED CORN CULTIVATORS
Filed Jan. 6, 1928
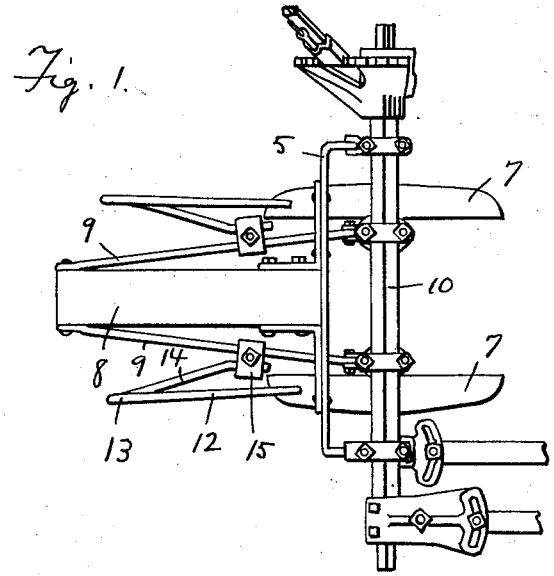
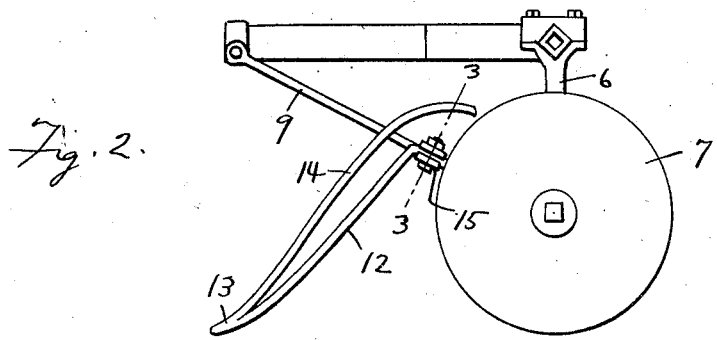
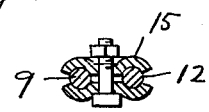
Inventor
J. F. Kroupa

UNITED STATES PATENT OFFICE

JAROSLAV F. KROUPA, OF KIMBALL, SOUTH DAKOTA

ATTACHMENT FOR LISTED-CORN CULTIVATORS

Application filed January 6, 1928. Serial No. 244,916.

The present invention relates to an attachment designed particularly for use on listed corn cultivators and has for its prime object to provide means for preventing the listed corn from being blown under the wheels of the cultivator.

A still further important object of the invention resides in the provision of an attachment of this nature which may be secured to the ordinary construction of a listed corn cultivator as to pick up the corn in windy weather or after a storm, when the corn is leaning across the road, so as to prevent the wheels of the cultivator from running over the corn stalks or leaves and thus destroying the same.

A still further important object of the invention resides in the provision of an attachment of this nature which is simple in its construction, easy to assemble on the cultivator, strong and durable, inexpensive to manufacture, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary top plan view of a listed corn cultivator showing a pair of my attachments mounted thereon, Figure 2 is a side elevation thereof, and Figure 3 is an enlarged detail section taken substantially on the line 3—3 of Figure 2.

Referring to the drawing in detail it will be seen that the numeral 5 denotes a frame having its standard 6 depending therefrom with wheels 7 journaled on their lower ends. A tongue 8 projects forwardly from the frame and braces 9 extend from the front end of the tongue or beam 8 to a cross member 10, to which the frame bar is attached and from which the standards 6 depend and to which the cultivating implements are attached. The parts thus far described are conventional and have been illustrated merely to bring out clearly the utility of the present embodiment of my invention. There are two of the attachments shown each comprising a substantially V-shaped structure including a leg 12 with its upper end offset and its lower end merging into an apex 13 from which merges upwardly a curved leg 14 the upper end of which is disposed to one side and over the upper end of the leg 12 as is clearly illustrated in Figures 1 and 2 when considered together.

The offset end of the leg 12 is received in a clamp 15 which is also engaged on the brace 9. Obviously this clamp may be adjusted along the brace 9 as may be desired to dispose the attachment a desired distance ahead of the wheel chassis. The leg 12 is bent at its upper end so that it inclines downwardly and to the side of the cultivator so that the apex is disposed directly in front of the wheel 7 and furthermore to provide for the apex to touch the ground.

From the above detailed description it will be seen that when the attachments are properly positioned on the cultivator and the cultivator moves along the listed corn any leaning corn will be picked up and directed outwardly from the wheels so as not to be trampled on by said wheels.

It is thought that the construction, utility and advantages of this invention will now be quite apparent to those skilled in this art without a more detailed description thereof. The present embodiment of the invention has been disclosed in detail merely by way of example since in actual practice it contains the features of advantages enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a lister corn cultivator wherein the cultivator includes a frame, a cross member, a tongue projecting forwardly from the frame, wheels, means mounting the wheels below the cross member, braces extending diagonally between the tongue and cross members, of a substantially V-shaped attachment straddling the path of the wheels, a clamp detachably connected to the braces, and longitudinally adjustable with respect thereto, one leg of said attachment detachably secured to said clamp to provide for spacing the apex in a predetermined distance in front of the wheels and also with respect to the ground.

In testimony whereof I affix my signature.

JAROSLAV F. KROUPA.